United States Patent
Keller

(10) Patent No.: US 6,393,529 B1
(45) Date of Patent: May 21, 2002

(54) CONVERSATION OF DISTRIBUTED MEMORY BANDWIDTH IN MULTIPROCESSOR SYSTEM WITH CACHE COHERENCY BY TRANSMITTING CANCEL SUBSEQUENT TO VICTIM WRITE

(75) Inventor: James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/370,970

(22) Filed: Aug. 10, 1999

Related U.S. Application Data

(63) Continuation-in-part of application No. 09/217,699, filed on Dec. 21, 1998.

(51) Int. Cl.⁷ ............................................. G06F 12/08

(52) U.S. Cl. ...................... 711/141; 709/216; 711/143; 711/147; 712/28

(58) Field of Search .......................... 709/216; 711/141, 711/143, 147; 712/28

(56) References Cited

U.S. PATENT DOCUMENTS

| | | | |
|---|---|---|---|
| 5,560,038 A | 9/1996 | Haddock ..................... | 709/236 |
| 5,659,708 A | 8/1997 | Arimilli et al. ............. | 711/146 |
| 5,684,977 A | * 11/1997 | Van Loo et al. ............ | 711/143 |

(List continued on next page.)

FOREIGN PATENT DOCUMENTS

| | | |
|---|---|---|
| EP | 0 379 771 | 8/1990 |
| EP | 0 412 353 | 2/1991 |
| EP | 0 611 026 | 8/1994 |
| EP | 0 777 184 | 6/1997 |

OTHER PUBLICATIONS

Jhang et al., "A New Write–Invalidate Snooping Cache Coherence Protocol for Split Transaction Bus–Based Multiprocessor Systems," IEEE TENCON, Oct. 1993, pp. 229–232.

Prete, "RST Cache Memory Design for a Tightly Coupled Multiprocessor System," IEEE Micro, vol. 11, No. 2, Apr. 1991, pp. 16–19 and 40–52.

*Primary Examiner*—Kenneth S. Kim
(74) *Attorney, Agent, or Firm*—Conley, Rose & Tayon, PC; Lawrence J. Merkel

(57) ABSTRACT

A messaging scheme that conserves system memory bandwidth and maintains cache coherency during a victim block write operation in a multiprocessing computer system is described. A source node having a dirty victim cache block—a modified cache block that is being written back to a corresponding system memory—sends a victim block command along with the dirty cache block data to the target processing node having associated therewith the corresponding system memory. The target node responds with a target done message sent to the source node and also initiates a memory write cycle to transfer the received cache block to the corresponding memory location. If the source node encounters an invalidating probe between the time it sent the victim block command and the time it received the target done response, the source node sends a memory cancel response to the target node. The memory cancel response helps maintain cache coherency within the system by causing the target node to abort further processing of the memory write cycle involving the victim block because the victim block may no longer contain the valid data. The memory cancel response may also conserve the system memory bandwidth by attempting to avoid relatively lengthy memory write cycles when the victim block may represent stale data. If the source node receives the target done response and if the victim block is still valid, the source node sends, instead, a source done message to the target node to indicate completion of the victim block transfer operation and to allow the target node to commit the victim block to the corresponding memory location.

21 Claims, 16 Drawing Sheets

U.S. PATENT DOCUMENTS

| | | | |
|---|---|---|---|
| 5,859,983 A | 1/1999 | Heller et al. | 709/251 |
| 5,887,138 A | 3/1999 | Hagersten et al. | 709/215 |
| 5,893,144 A | 4/1999 | Wood et al. | 711/122 |
| 5,991,819 A | 11/1999 | Young | 709/253 |
| 6,012,127 A | 1/2000 | McDonald et al. | 711/141 |
| 6,018,791 A | 1/2000 | Arimilli et al. | 711/141 |
| 6,038,644 A | 3/2000 | Irie et al. | 711/141 |
| 6,049,851 A | 4/2000 | Bryg et al. | 711/141 |
| 6,070,231 A | 5/2000 | Ottinger | 711/141 |
| 6,098,115 A | 8/2000 | Eberhard et al. | 710/7 |
| 6,108,737 A | 8/2000 | Sharma et al. | 710/107 |
| 6,108,752 A * | 8/2000 | VanDoren et al. | 711/117 |
| 6,138,218 A | 10/2000 | Arimilli et al. | 711/146 |
| 6,275,905 B1 | 8/2001 | Keller et al. | 711/141 |

* cited by examiner

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | | SrcTag[6:2] | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | | SrcTag[6:2] | | | | |
| 4 | | | | | | | | |

| Bit Time | 7 | 6 | 5 | 4 | 3 | 2 | 1 | 0 |
|---|---|---|---|---|---|---|---|---|
| 1 | TgtNode[1:0] | | CMD[5:0] | | | | | |
| 2 | SrcTag[1:0] | | SrcNode[3:0] | | | | TgtNode[3:2] | |
| 3 | | Count | | | SrcTag[6:2] | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | Data [7:0] | | | | | | | |
| 2 | Data [15:8] | | | | | | | |
| 3 | Data [23:16] | | | | | | | |
| 4 | Data [31:24] | | | | | | | |
| 5 | Data [39:32] | | | | | | | |
| 6 | Data [47:40] | | | | | | | |
| 7 | Data [55:48] | | | | | | | |
| 8 | Data [63:56] | | | | | | | |

| CMD Code | Command | Packet Type |
|---|---|---|
| 000000 | Nop | Info |
| 000001 | Interrupt Broadcast | Command |
| 000011 | Reserved | - |
| 000100 | Probe/Src | Command/Address |
| 000101 | Probe/Tgt | Command/Address |
| 00011x | Reserved | - |
| 001000 | RdBlkS | Command/Address |
| 001001 | RdBlk | Command/Address |
| 001010 | RdBlkMod | Command/Address |
| 001011 | ChangeToDirty | Command/Address |
| 001100 | ValidateBlk | Command/Address |
| 001110 | CleanVicBlk | Command/Address |
| 001101 | Interrupt Target | Command |
| 001111 | VicBlk | Command/Address/Data |
| 01xxxx | Read(Sized) | Command/Address |
| 10xxxx | Write(Sized) | Command/Address/Data |
| 11000x | RdResponse | Rd Response |
| 11001x | Reserved | - |
| 11010x | ProbeResp | Response |
| 11011x | Reserved | - |
| 111000 | SrcDone | Response |
| 111001 | MemCancel | Response |
| 111010 | TgtStart | Response |
| 111011 | Reserved | - |
| 11110x | TgtDone | Response |
| 111110 | IntrResponse | Response |
| 111111 | Error | Info |

| Bit Time | 7 | 6 | 5 | 4 | 3 | 2 | 1 | 0 |
|---|---|---|---|---|---|---|---|---|
| 1 | TgtNode[1:0] | | CMD[5:0] | | | | | |
| 2 | SrcTag[1:0] | | SrcNode[3:0] | | | | TgtNode[3:2] | |
| 3 | NextState[1:0] | | DM | SrcTag[6:2] | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Next State [1:0] | Next State |
|---|---|
| 0 | No Change |
| 1 | Shared:<br>Clean → Shared<br>Dirty → Shared/Dirty |
| 2 | Invalid |

| Bit Time | 7 | 6 | 5 | 4 | 3 | 2 | 1 | 0 |
|---|---|---|---|---|---|---|---|---|
| 1 | RespNode[1:0] | | CMD[5:0] | | | | | |
| 2 | SrcTag[1:0] | | SrcNode[3:0] | | | | TgtNode[3:2] | |
| 3 | Count | | | | SrcTag[6:2] | | | |
| 4 | Rsv | | | | | | Probe | Type |

| Probe | Probe | Type, Count |
|---|---|---|
| 0 | X | Encode Length of Data Packet |
| 1 | 0 | Cache Block: Type Must be 1, Count Must be 7 |
| 1 | 1 | Cache Block: Type Must be 1, Count Must be 7 |

| Bit Time | 7 | 6 | 5 | 4 | 3 | 2 | 1 | 0 |
|---|---|---|---|---|---|---|---|---|
| 1 | RespNode[1:0] | | CMD[5:0] | | | | | |
| 2 | SrcTag[1:0] | | SrcNode[3:0] | | | | RespNode[3:2] | |
| 3 | Rsv | | Hit | SrcTag[6:2] | | | | |
| 4 | | | | | | | | |

FIG. 12

CONVERSATION OF DISTRIBUTED MEMORY BANDWIDTH IN MULTIPROCESSOR SYSTEM WITH CACHE COHERENCY BY TRANSMITTING CANCEL SUBSEQUENT TO VICTIM WRITE

This application is a continuation-in-part of U.S. patent application Ser. No. 09/217,699, filed Dec. 21, 1998.

BACKGROUND OF THE INVENTION

1. Field of the invention

The present invention broadly relates to computer systems, and more particularly, to a messaging scheme to accomplish cache-coherent data transfers in a multiprocessing computing environment.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge, which manages the transfer of information between the shared bus and the I/O devices. The processors are typically coupled directly to the shared bus or through a cache hierarchy.

Unfortunately, shared bus systems suffer from several drawbacks. For example, since there are multiple devices attached to the shared bus, the bus is typically operated at a relatively low frequency. Further, system memory read and write cycles through the shared system bus take substantially longer than information transfers involving a cache within a processor or involving two or more processors. Another disadvantage of the shared bus system is a lack of scalability to larger number of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting to access the bus. Overall performance may be decreased unless a mechanism is provided to conserve the limited system memory bandwidth.

A read or a write operation addressed to a non-cache system memory takes more processor clock cycles than similar operations between two processors or between a processor and its internal cache. The limitations on bus bandwidth, coupled with the lengthy access time to read or write to a system memory, negatively affect the computer system performance.

One or more of the above problems may be addressed using a distributed memory system. A computer system employing a distributed memory system includes multiple nodes. Two or more of the nodes are connected to memory, and the nodes are interconnected using any suitable interconnect. For example, each node may be connected to each other node using dedicated lines. Alternatively, each node may connect to a fixed number of other nodes, and transactions may be routed from a first node to a second node to which the first node is not directly connected via one or more intermediate nodes. The memory address space is assigned across the memories in each node.

Nodes may additionally include one or more processors. The processors typically include caches that store cache blocks of data read from the memories. Furthermore, a node may include one or more caches external to the processors. Since the processors and/or nodes may be storing cache blocks accessed by other nodes, a mechanism for maintaining coherency within the nodes is desired.

SUMMARY OF THE INVENTION

The problems outlined above are in large part solved by a computer system as described herein. The computer system may include multiple processing nodes, two or more of which may be coupled to separate memories which may form a distributed memory system. The processing nodes may include caches, and the computer system may maintain coherency between the caches and the distributed memory system.

In one embodiment, the present invention relates to a multiprocessing computer system where the processing nodes are interconnected through a plurality of dual unidirectional links. Each pair of unidirectional links forms a coherent link structure that connects only two of the processing nodes. One unidirectional link in the pair of links sends signals from a first processing node to a second processing node connected through that pair of unidirectional links. The other unidirectional link in the pair carries a reverse flow of signals, i.e. it sends signals from the second processing node to the first processing node. Thus, each unidirectional link forms as a point-to-point interconnect that is designed for packetized information transfer. Communication between two processing nodes may be routed through more than one remaining nodes in the system.

Each processing node may be coupled to a respective system memory through a memory bus. The memory bus may be bidirectional. Each processing node comprises at least one processor core and may optionally include a memory controller for communicating with the respective system memory. Other interface logic may be included in one or more processing nodes to allow connectivity with various I/O devices through one or more I/O bridges.

In one embodiment, one or more I/O bridges may be coupled to their respective processing nodes through a set of non-coherent dual unidirectional links. These I/O bridges communicate with their host processors through this set of non-coherent dual unidirectional links in much the same way as two directly-linked processors communicate with each other through a coherent dual unidirectional link.

At some point during program execution, the processing node with a dirty copy of the memory data in its cache may discard the cache block containing that modified data. In one embodiment, that processing node (also called, the source node) transmits a victim block command along with the dirty cached data to the second processing node, i.e. the node that is coupled to the portion of the system memory that has a corresponding memory location for the cached data. The second processing node (also called, the target node) responds with a target done message that is sent to the transmitting processing node, and initiates a memory write cycle to transfer the received data to its associated non-cache memory to update content of the corresponding memory location. If the transmitting processing node encounters an invalidating probe between the time it sent the victim block command and the time it received the target done response, the transmitting node sends a memory cancel response to the target node—the second processing node—to abort further processing of the memory write cycle. This may advantageously conserve the system memory bandwidth and avoid time-consuming memory write operation when the data to be written in the non-cache memory is stale.

The memory cancel response may maintain cache coherency during a victim block write operation, especially in a situation when the victim block arrives at the target node (i.e., the second processing node) after a read command from a third processing node (other than the source node that sent the victim block) to read the content of the memory location that is the destination for the victim block. The read command may manifest the third processing node's intent to modify the data read from that memory location. The target node, therefore, may responsively transmit an invalidating probe to each processing node in the system, including the source node. As the later-arriving victim block may not contain the most current data and may not need to be committed to the corresponding memory location in the target node memory, the source node sends the memory cancel response to the target node when the source node receives the target done response. Further, as the target done response is received after the intervening invalidating probe, the memory cancel response from the source node thus helps maintain cache coherency among the processing nodes.

BRIEF DESCRIPTION OF THE DRAWINGS

A better understanding of the present invention can be obtained when the following detailed description of the preferred embodiment is considered in conjunction with the following drawings, in which:

FIG. 3 is a block diagram of one embodiment of an information packet.

FIG. 4 is a block diagram of one embodiment of an address packet.

FIG. 5 is a block diagram of one embodiment of a response packet.

FIG. 6 is a block diagram of one embodiment of a command packet.

FIG. 7 is a block diagram of one embodiment of a data packet.

FIG. 8 is a table illustrating exemplary packet types that may be employed in the computer system of FIG. 1.

FIG. 10A is a block diagram of one embodiment of a probe command packet.

FIG. 10B is a block diagram for one embodiment of the encoding for the NextState field in the probe command packet of FIG. 10A.

FIG. 11A is a block diagram of one embodiment of a read response packet.

FIG. 11B shows in one embodiment the relationship between the Probe, Tgt and Type fields of the read response packet of FIG. 11A.

FIG. 12 is a block diagram of one embodiment of a probe response packet.

DETAILED DESCRIPTION OF THE PREFERRED EMBODIMENT

Figure 1:
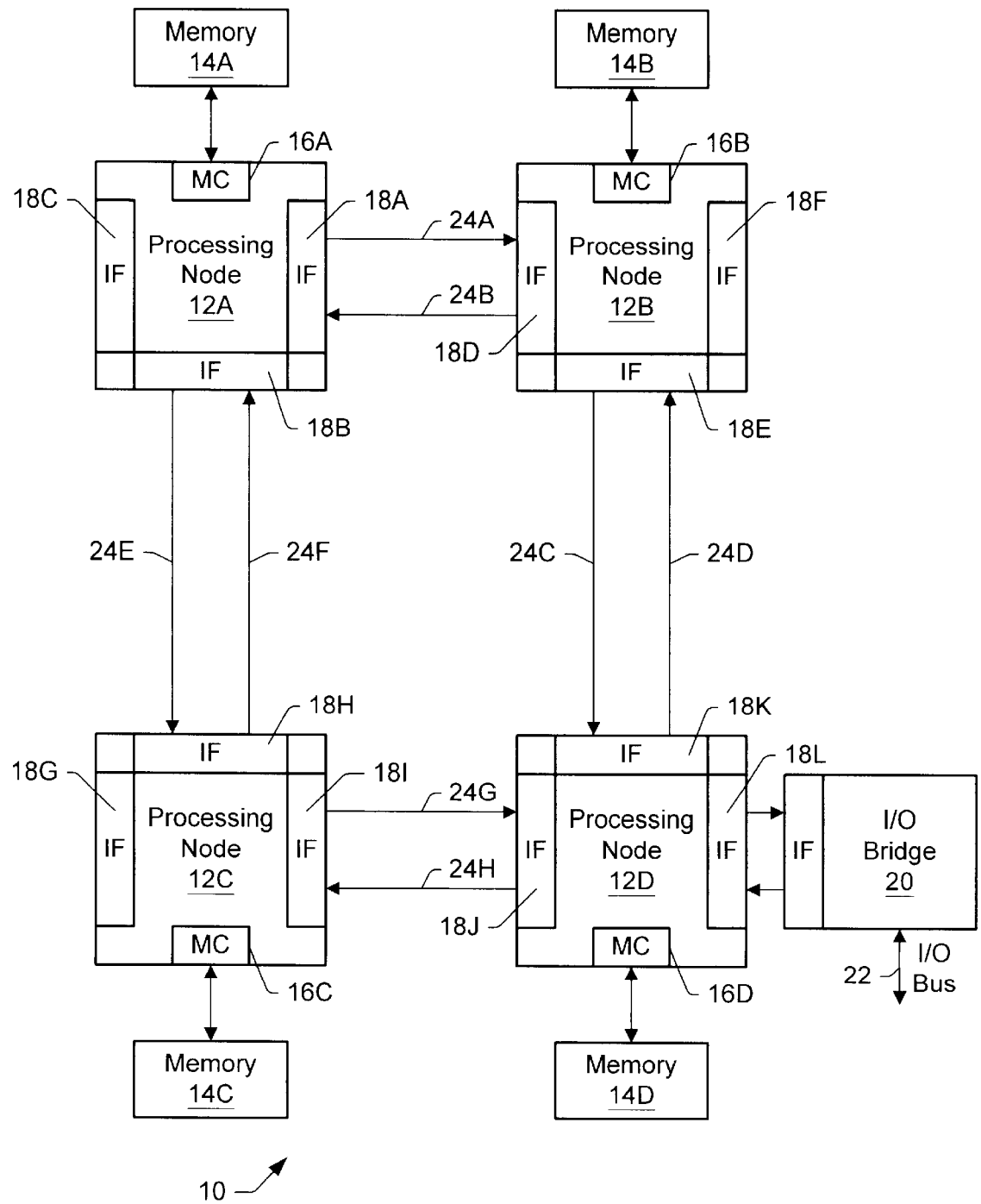
FIG. 1 is a block diagram of one embodiment of a computer system.

Turning now to FIG. 1, one embodiment of a multiprocessing computer system 10 is shown. In the embodiment of FIG. 1, computer system 10 includes several processing nodes 12A, 12B, 12C, and 12D. Each processing node is coupled to a respective memory 14A–14D via a memory controller 16A–16D included within each respective processing node 12A–12D. Additionally, processing nodes 12A–12D include one or more interface ports 18, also known as interface logic, to communicate among the processing nodes 12A–12D, and to also communicate between a processing node and a corresponding I/O bridge. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an I/O bridge 20 via interface logic 18L. Other processing nodes may communicate with other I/O bridges in a similar fashion. I/O bridge 20 is coupled to an I/O bus 22.

The interface structure that interconnects processing nodes 12A–12D includes a set of dual-unidirectional links. Each dual-unidirectional link is implemented as a pair of packet-based unidirectional links to accomplish high-speed packetized information transfer between any two processing nodes in the computer system 10. Each unidirectional link may be viewed as a pipelined, split-transaction interconnect. Each unidirectional link 24 includes a set of coherent unidirectional lines. Thus, each pair of unidirectional links may be viewed as comprising one transmission bus carrying a first plurality of binary packets and one receiver bus carrying a second plurality of binary packets. The content of a binary packet will primarily depend on the type of operation being requested and the processing node initiating the operation. One example of a dual-unidirectional link structure is links 24A and 24B. The unidirectional lines 24A are used to transmit packets from processing node 12A to processing node 12B and lines 24B are used to transmit packets from processing node 12B to processing node 12A. Other sets of lines 24C–24H are used to transmit packets between their corresponding processing nodes as illustrated in FIG. 1.

A similar dual-unidirectional link structure may be used to interconnect a processing node and its corresponding I/O device, or a graphic device or an I/O bridge as is shown with respect to the processing node 12D. A dual-unidirectional link may be operated in a cache coherent fashion for communication between processing nodes or in a non-coherent fashion for communication between a processing node and an external I/0 or graphic device or an I/O bridge. It is noted that a packet to be transmitted from one processing node to another may pass through one or more remaining nodes. For example, a packet transmitted by processing node 12A to processing node 12D may pass through either processing node 12B or processing node 12C in the arrangement of FIG. 1. Any suitable routing algorithm may be used. Other embodiments of computer system 10 may include more or fewer processing nodes than those shown in FIG. 1.

Processing nodes 12A–12D, in addition to a memory controller and interface logic, may include other circuit elements such as one or more processor cores, an internal cache memory, a bus bridge, a graphics logic, a bus controller, a peripheral device controller, etc. Broadly speaking, a processing node comprises at least one processor and may optionally include a memory controller for communicating with a memory and other logic as desired. Further, each circuit element in a processing node may be coupled to one or more interface ports depending on the functionality being performed by the processing node. For example, some circuit elements may only couple to the interface logic that connects an I/O bridge to the processing node, some other circuit elements may only couple to the interface logic that connects two processing nodes, etc. Other combinations may be easily implemented as desired.

Memories 14A–14D may comprise any suitable memory devices. For example, a memory 14A–14D may comprise one or more RAMBUS DRAMs (RDRAMs), synchronous DRAMs (SDRAMs), static RAM, etc. The memory address space of the computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory that is storing the bytes corresponding to the address. In other words, the memory controller 16A–16D is responsible for ensuring that each memory access to the corresponding memory 14A–14D occurs in a cache coherent fashion. Memory controllers 16A–16D may comprise control circuitry for interfacing to memories 14A–14D. Additionally, memory controllers 16A–16D may include request queues for queuing memory requests.

Generally, interface logic 18A–18L may comprise a variety of buffers for receiving packets from one unidirectional link and for buffering packets to be transmitted upon another unidirectional link. Computer system 10 may employ any suitable flow control mechanism for transmitting packets. For example, in one embodiment, each transmitting interface logic 18 stores a count of the number of each type of buffers within the receiving interface logic at the other end of the link to which the transmitting interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2:
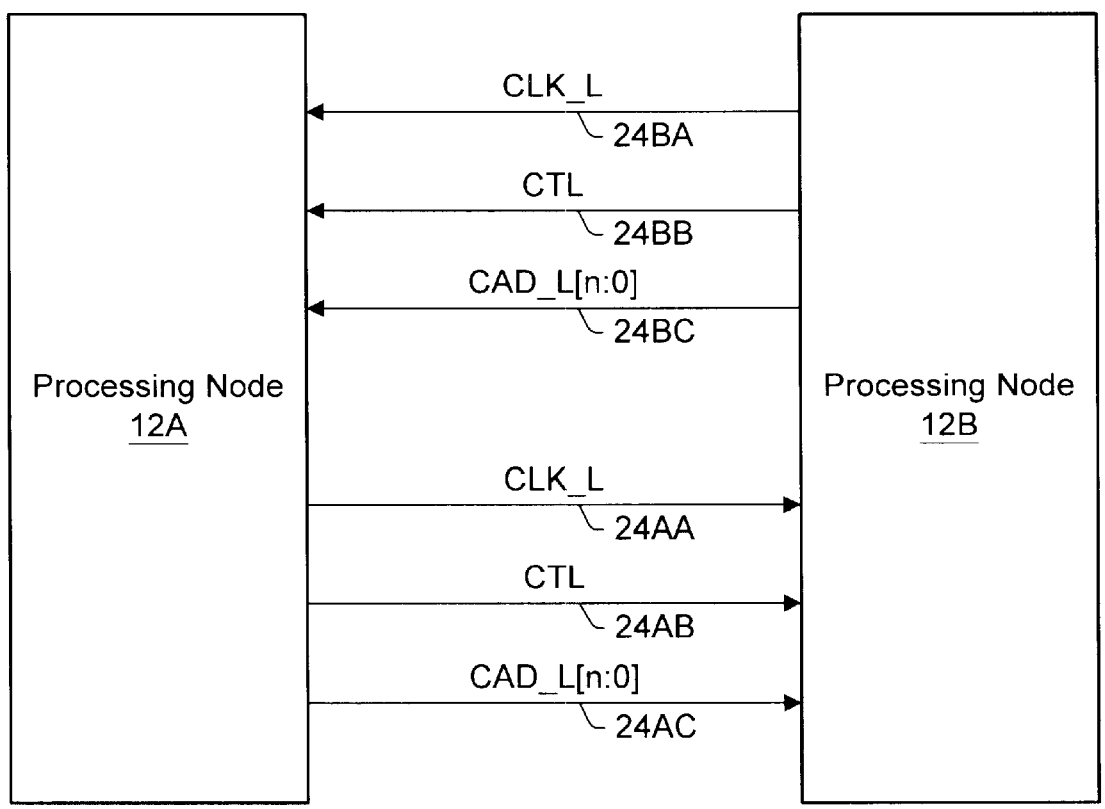
FIG. 2 shows in detail one embodiment of the interconnect between a pair of processing nodes from FIG. 1.

Turning next to FIG. 2, a block diagram illustrating processing nodes 12A and 12B is shown to illustrate in more detail one embodiment of the dual unidirectional link structure connecting the processing nodes 12A and 12B. In the embodiment of FIG. 2, lines 24A (the unidirectional link 24A) include a clock line 24AA, a control line 24AB, and a command/address/data bus 24AC. Similarly, lines 24B (the unidirectional link 24B) include a clock line 24BA, a control line 24BB, and a command/address/data bus 24BC.

A clock line transmits a clock signal that indicates a sample point for its corresponding control line and the command/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the command/address/data bus. For example, two clock lines may be used for a 32 bit command/address/data bus (with one half of the command/address/data bus referenced to one of the clock lines and the other half of the command/address/data bus and the control line referenced to the other one of the clock lines.

The control line indicates whether or not the data transmitted upon the command/address/data bus is either a bit time of a control packet or a bit time of a data packet. The control line is asserted to indicate a control packet, and deasserted to indicate a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets that interrupt a data packet may not indicate that a data packet will be following.

The command/address/data bus comprises a set of lines for transmitting the data, command, response and address bits. In one embodiment, the command/address/data bus may comprise 8, 16, or 32 lines. Each processing node or I/O bridge may employ any one of the supported numbers of lines according to design choice. Other embodiments may support other sizes of command/address/data bus as desired.

According to one embodiment, the command/address/data bus lines and the clock line may carry inverted data (i.e. a logical one is represented as a low voltage on the line, and a logical zero is represented as a high voltage). Alternatively, these lines may carry non-inverted data (in which a logical one is represented as a high voltage on the line, and logical zero is represented as a low voltage). A suitable positive and negative logic combination may also be implemented.

Turning now to FIGS. 3–7, exemplary packets employed in a cache-coherent communication (i.e., the communication between processing nodes) according to one embodiment of computer system 10 are shown. FIGS. 3–6 illustrate control packets and FIG. 7 illustrates a data packet. Other embodiments may employ different packet definitions. The control packets and the data packet may collectively be referred to as binary packets. Each packet is illustrated as a series of bit times enumerated under the "bit time" heading. The bit times of the packet are transmitted according to the bit time order listed. FIGS. 3–7 illustrate packets for an eight-bit command/address/data bus implementation. Accordingly, eight bits (numbered seven through zero) of control or data information is transferred over the eight-bit command/address/data bus during each bit time. Bits for which no value is provided in the figures may either be reserved for a given packet, or may be used to transmit packet-specific information.

FIG. 3 illustrates an information packet (info packet) 30. Info packet 30 comprises two bit times on an eight bit link. The command encoding is transmitted during bit time one, and comprises six bits—denoted by the command field CMD[5:0]—in the present embodiment. An exemplary command field encoding is shown in FIG. 8. Each of the other control packets shown in FIGS. 4, 5 and 6 includes the command encoding in the same bit positions during bit time 1. Info packet 30 may be used to transmit messages between processing nodes when the messages do not include a memory address.

FIG. 4 illustrates an address packet 32. Address packet 32 comprises eight bit times on an eight bit link. The command encoding is transmitted during bit time 1, along with a portion of the destination node number denoted by the field DestNode. The remainder of the destination node number and the source node number (SrcNode) are transmitted during bit time two. A node number unambiguously identifies one of the processing nodes 12A–12D within computer system 10, and is used to route the packet through computer system 10. Additionally, the source of the packet may assign a source tag (SrcTag) transmitted during bit times 2 and 3. The source tag identifies packets corresponding to a particular transaction initiated by the source node (i.e. each packet corresponding to a particular transaction includes the same source tag). Thus, for example, when the SrcTag field is of 7-bit length, the corresponding source node can have up to 128 ($2^7$) different transactions in progress in the system. Responses from other nodes in the system will be associated to corresponding transactions through the SrcTag field in the responses. Bit times four through eight are used to transmit the memory address—denoted by the address field Addr [39:0]—affected by the transaction. Address packet 32 may be used to initiate a transaction, e.g., a read or a write transaction.

FIG. 5 illustrates a response packet 34. Response packet 34 includes the command encoding, destination node number, source node number, and source tag similar to the address packet 32. The SrcNode (source node) field preferably identifies the node that originated the transaction that prompted the generation of the response packet. The DestNode (destination node) field, on the other hand, identifies the processing node—the source node or the target node (described later)—that is the final receiver of the response packet. Various types of response packets may include additional information. For example, a read response packet, described later with reference to FIG. 11A, may indicate the amount of read data provided in a following data packet. Probe responses, described later with reference to FIG. 12, may indicate whether or not a hit was detected for the requested cache block. Generally, response packet 34 is used for commands that do not require transmission of the address during the carrying out of a transaction. Furthermore, response packet 34 may be used to transmit positive acknowledgement packets to terminate a transaction.

FIG. 6 shows an example of a command packet 36. As mentioned earlier, each unidirectional link is a pipelined, split-transaction interconnect in which transactions are tagged by the source node and responses can return to the source node out of order depending on the routing of packets at any given instance. A source node sends a command packet to initiate a transaction. Source nodes contain address-mapping tables and place the target node number (TgtNode field) within the command packet to identify the processing node that is the destination of the command packet 36. The command packet 36 has CMD field, SrcNode field, SrcTag field and Addr field that are similar to the ones shown and described with reference to the address packet 32 (FIG. 4).

One distinct feature of the command packet 36 is the presence of the Count field. In a non-cacheable read or write operation, the size of data may be less than the size of a cache block. Thus, for example, a non-cacheable read operation may request just one byte or one quad word (64-bit length) of data from a system memory or an I/O device. This type of sized read or write operation is facilitated with the help of the Count field. Count field, in the present example, is shown to be of three-bit length. Hence, a given sized data (byte, quad-word etc.) may be transferred a maximum of eight times. For example, in an 8-bit link, when the value of count field is zero (binary 000), the command packet 36 may indicate transfer of just one byte of data over one bit time; whereas, when the value of the count field is seven (binary 111), a quad word, i.e. eight bytes, may be transferred for a total of eight bit times. The CMD field may identify when a cache block is being transferred. In that case, the count field will have a fixed value; seven in the situation when the cache block is 64-byte size, because eight quad words need be transferred to read or write a cache block. In the case of an 8-bit wide unidirectional link, this may require transfer of eight complete data packets (FIG. 7) over 64 bit times. Preferably, the data packet (described later with reference to FIG. 7) may immediately follow a write command packet or a read response packet (described later) and the data bytes may be transferred in an increasing address order. Data transfers of a single byte or a quad word may not cross a naturally aligned 8 or 64 byte boundary, respectively.

FIG. 7 illustrates a data packet 38. Data packet 38 includes eight bit times on an eight bit link in the embodiment of FIG. 7. Data packet 38 may comprise a 64-byte cache block, in which case it would take 64 bit times (on an 8-bit link) to complete the cache block transfer. Other embodiments may define a cache block to be of a different size, as desired. Additionally, data may be transmitted in less than a cache block size for non-cacheable reads and writes as mentioned earlier with reference to the command packet 36 (FIG. 6). Data packets for transmitting data less than cache block size require fewer bit times.

FIGS. 3–7 illustrate packets for an eight-bit link. Packets for 16 and 32 bit links may be formed by concatenating consecutive bit times illustrated in FIGS. 3–7. For example, bit time one of a packet on a 16-bit link may comprise the information transmitted during bit times one and two on the eight-bit link. Similarly, bit time one of the packet on a 32-bit link may comprise the information transmitted during bit times one through four on the eight-bit link. Formulas 1 and 2 below illustrate the formation of bit time one of a 16 bit link and bit time one of a 32 bit link in terms of bit times for an eight bit link.

$$BT1_{16}[15:0]=BT2_8[7:0]\|BT1_8[7:0] \tag{1}$$

$$BT1_{32}[31:0]=BT4_8[7:0]\|BT3_8[7:0]\|BT2_8[7:0]\|BT1_8[7:0] \tag{2}$$

Turning now to FIG. 8, a table 40 is shown illustrating commands employed for one exemplary embodiment of the dual-unidirectional link structure within computer system 10. Table 40 includes a command code column illustrating the command encodings (the CNML field) assigned to each command, a command column naming the command, and a packet type column indicating which of the command packets 30–8 (FIGS. 3–7) is used for that command. A brief functional explanation for some of the commands in FIG. 8 is given below.

A read transaction is initiated using one of the Rd(Sized), RdBlk, RdBlkS or RdBlkMod commands. The sized read command, Rd(Sized), is used for non-cacheable reads or reads of data other than a cache block in size. The amount of data to be read is encoded into the Rd(Sized) command packet. For reads of a cache block, the RdBlk command may be used unless: (i) a writeable copy of the cache block is desired, in which case the RdBlkMod command may be used; or (ii) a copy of the cache block is desired but no intention to modify the block is known. The RdBlkS command may be used to make certain types of coherency schemes (e.g. directory based coherency schemes) more efficient. In response to the RdBlkS command, the target node may return the cache block to the source node in a shared state. In general, the appropriate read command is transmitted from the source node initiating a read transaction to a target node that owns the memory corresponding to the cache block requested by the source node.

The ChangeToDirty packet may be transmitted by a source node in order to obtain write permission for a cache block that is stored in the source node in a non-writeable or read-only state. A transaction initiated with a ChangeToDirty command may operate similar to a read except that the target node does not return data. The ValidateBlk command may be used to obtain write permission to a cache block not stored in the source node if the source node intends to update the entire cache block. No data is transferred to the source node for such a transaction, but otherwise operates similar to a read transaction. Preferably, the ValidateBlk and the ChangeToDirty commands may only be directed to a memory, and may only be generated by coherent nodes.

The Interrupt3roadcast, Interrupt Target, and IntrResponse packets may be used to broadcast interrupts, to send an interrupt to a particular target node, and to respond to interrupts, respectively. The CleanVicBlk command may be used to inform a memory controller that a cache block (a victim block) in the clean state has been discarded from a node (e.g. for directory based coherency schemes). The TgtStart command may be used by a target to indicate that a transaction has been started (e.g. for ordering of subsequent transactions). The Error command is used to transmit an error indication.

Figure 9:
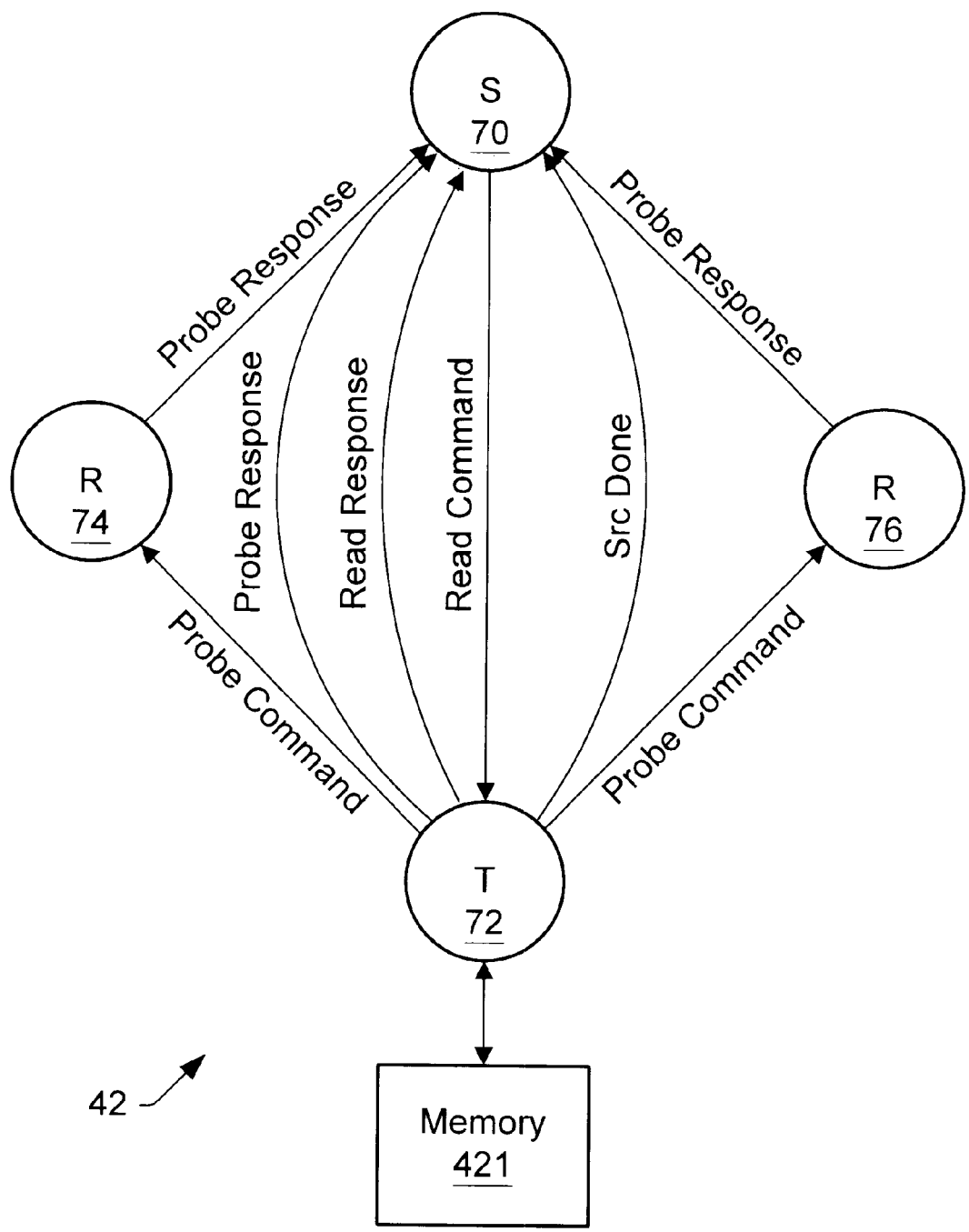
FIG. 9 is a diagram illustrating an example flow of packets corresponding to a memory read operation.
Figure 13:
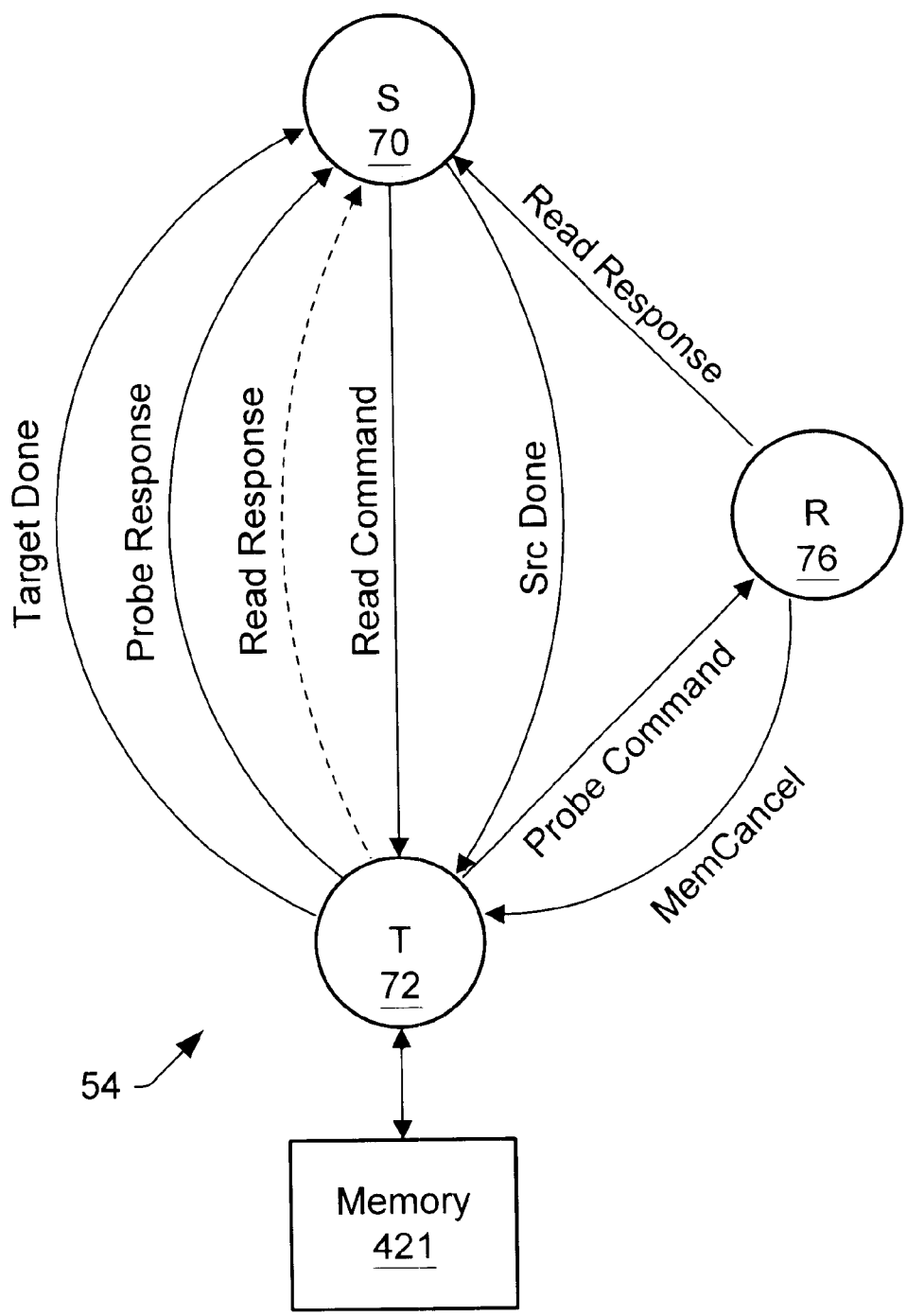
FIG. 13 is a diagram illustrating an example flow of packets involving a memory cancel response.
Figure 14:
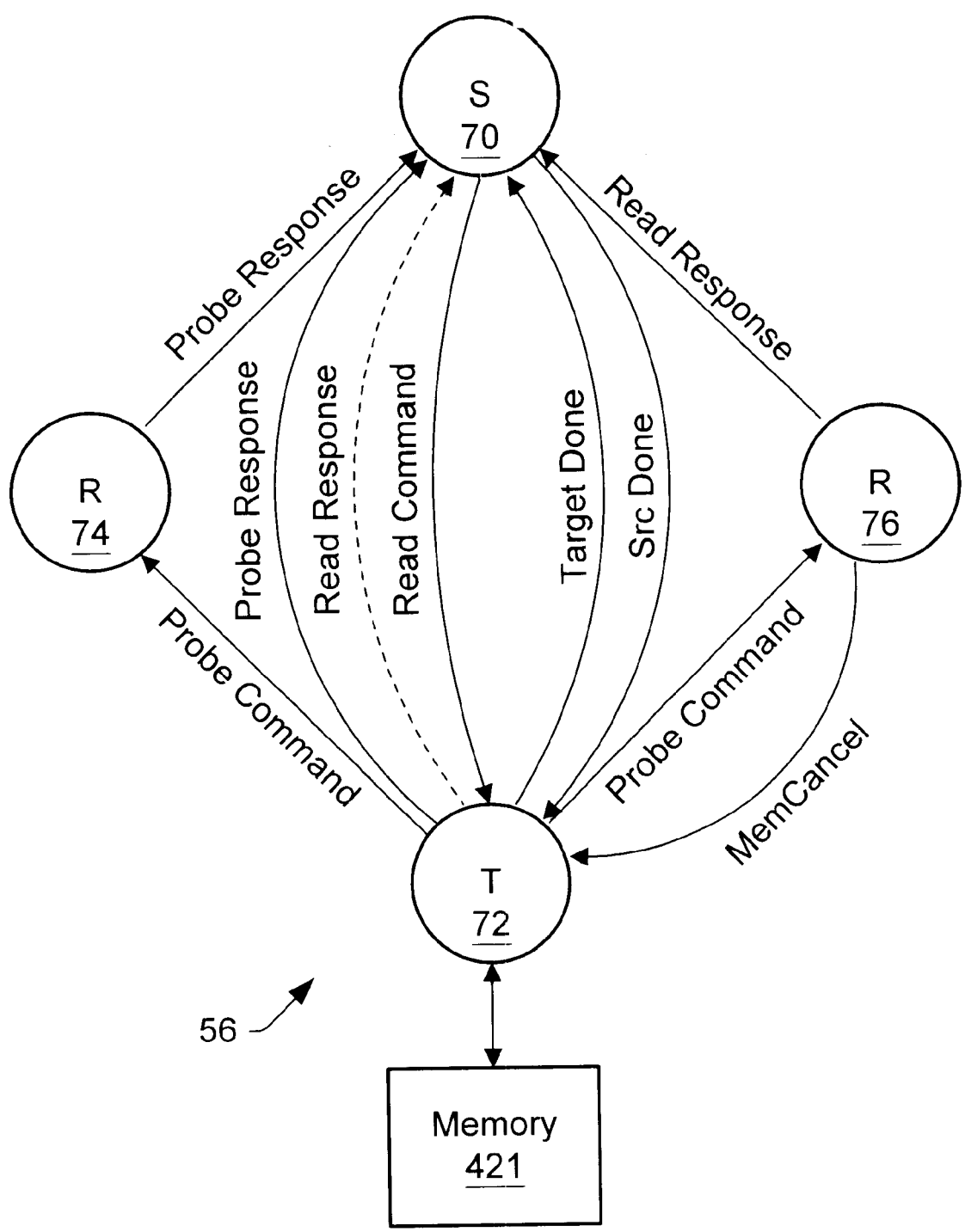
FIG. 14 is a diagram illustrating an example flow of packets showing a messaging scheme that combines probe commands and memory cancel response.

FIGS. 9, 13 and 14 depict some example flows of packets when a processing node in the computer system 10 attempts to read a designated memory location. The designated or corresponding system memory locations are, for explanation only, assumed to be in the system memory 421 associated with a target processing node 72. The system memory 421 may be a part of the target processing node 72 or may be external to the target node 72—as shown here. Further, during a memory read transaction, it may be possible that a copy of the designated memory location may already exist in the internal or external cache memory of the target node 72. In any event, the flow of packets remains the same whenever the source node 70 transmits a read command to read a designated memory location associated with the target node 72. It is noted that any processing node 12A–12D (FIG. 1) may function as a source node or a target node. The node that is not either a source node or a target node is referred to as a remaining node, here nodes 74 and 76. The same numerals are used in FIGS. 9, 13 and 14 to identify the source node, the target node, and the remaining nodes for the sake of clarity only; it does not imply that the source node 70 in FIG. 9 is the same source node in FIG. 13, etc.

As mentioned earlier, any processing node in FIG. 1 may function as a source node, a target node or a remaining node depending on the particular transaction. The arrangements shown in FIGS. 9, 13 and 14 are for illustrative purpose only, and they do not imply similar actual connections among the processing nodes 12A–12D. That is, a remaining node, e.g. node 76, or the target node 72 may not be directly connected to the source node 70. Hence, additional packet routing may occur. Further, the arrangements of FIGS. 9, 13 and 14 are described with reference to the circuit topology in FIG. 1. It is understood that other interconnections between two or more processing nodes may be contemplated and the packet transfer schemes of FIGS. 9, 13 and 14 may be easily implemented in those various interconnections. The arrows are used to indicate dependencies and represent packets that must be sent between respective nodes joined by the arrows. Generally, the outgoing arrows may not be taken until all corresponding incoming dependencies have happened. This is illustrated further below with reference to the operations depicted in FIGS. 9, 13 and 14.

Referring now to FIG. 9, a flow of packets 42 during a read transaction—a Rd(Sized) or a block read (RdBlk, RdBlkS, or RdBlkMod) command, as described earlier—is illustrated. The processor (not shown) in the source node 70 sends appropriate read command to the memory controller (not shown) in the target node 72. A typical command packet has been described earlier with reference to FIG. 6. Upon receiving the read command from the source processor, the target memory controller, in response, performs the following two operations: (1) It sends a RdResponse (read response) packet along with the requested data from the memory 421 to the source node 70, and (2) It also broadcasts a Probe/Src command to all the processing nodes in the computer system 10. Generally, the Probe/Src command (more simply, a probe command) is a request to a node to determine if a cache block is stored in that node and an indication of the actions to be taken by that node if the cache block is stored in that node. In one embodiment, when a packet is broadcast to more than one destination, the router at the receiving node that receives the packet first may terminate the packet at that node and recreate and transmit a copy of that packet to the adjacent processing nodes.

The exact order of execution of these previous two operations may depend on the status of pending operations in various internal buffers in the target node 72. Preferably, each processing node in the computer system 10 includes a number of buffers to store command packets, data packets associated with various command packets (for example, a memory write command), probes, response packets (for example, ProbeResp, SrcDone, TgtDone, MemCancel), and read responses (including both RdResponse packet and its associated data packet). Each data buffer may contain storage for a cache block of, for example, 64-byte size. In the alternative, any other convenient storage capacity may be implemented based on the design requirements.

The flow of binary packets between two processing nodes using the above mentioned buffers may be controlled by implementing the previously described "coupon-based" system. In that implementation, a transmitting node may contain a counter for each type of buffer at the receiving node. At system reset the transmitting node may clear its counters; and when the reset signal is deasserted, the receiving node may send an information packet (with a format similar to that shown in FIG. 3, with the CMD field identifying an Nop command) to the transmitting node to indicate how many buffers of each type it has available. When the transmitting node sends a packet to the receiving node it decrements the associated counter, and when a particular counter reaches a zero value the transmitting node processor stops sending packets to the associated buffer. When the receiver frees a buffer it sends another information packet to the transmitter, and the transmitter increments the associated counter. A transmitter may not start a memory write operation unless the receiver has both a command buffer and a data buffer available.

Referring back to FIG. 9, the memory controller in the target node 72 transmits the Probe/Src commands to other nodes in the system to maintain coherency by changing the state of the cache block in those nodes and by causing a node having an updated copy of the cache block to send the cache block to the source node. The scheme employs an indication within the probe command that identifies a receiving node to receive the probe responses. Here, the Probe/Src command (the probe command) causes each remaining node, 74 and 76, to transmit a ProbeResp (probe response) packet to the source node. The probe response indicates that the actions have been taken, and may include a transmission of data if the cache block has been modified by the node. If a probed node has an updated copy of the read data (i.e. dirty data), that node transmits a RdResponse (read response) packet and the dirty data as described later with reference to FIG. 13. The Probe/Src command may be received by a cache controller in a given processing node (including the target node 72), and the ProbeResp and the RdResponse may be generated by that cache controller. Generally, a cache controller in a processing node having an associated cache may generate a probe response packet in response to the Probe/Src command. In one embodiment, when a processing node does not have a cache that processing node may not generate a probe response packet.

Once each of the probe responses (from the remaining nodes 74 and 76) and the RdResponse with the requested data (from the target node 72) are received in the source node, the source node processor transmits a SrcDone (source done) response packet to the target node memory controller (not shown) as a positive acknowledgement of the termination of the transaction. To maintain coherency among the processing nodes during each read operation, the source node may not use the data received through the RdResponse from the target node 72 until all the probe responses (from the remaining nodes) are also received. When the target node receives the SrcDone response it removes the read command (received from the source node 70) from its command buffer queue, and it may, then, start to respond to a command to the same designated memory address.

By providing the flexibility to route the probe responses to different receiving nodes depending upon the command sent, the maintenance of coherency may be performed in a relatively efficient manner (e.g. using the fewest number of packet transmissions between processing nodes) while still ensuring that coherency is maintained. For example, probe commands indicating that the target or the source of transaction should receive probe responses corresponding to the transaction may be included. Probe commands may specify the source of the transaction as the receiving node for read transactions (such that dirty data is delivered to the source node from the node storing the dirty data). On the other hand, for write transactions (in which data is being updated in memory at the target node of the transaction), the probe commands may specify the target of the transaction as the receiving node. In this manner, the target may determine when to commit the write data to memory and may receive any dirty data to be merged with the write data.

FIGS. 10–12 depict one embodiment of the probe command, the read response and the probe response packets, respectively. The probe command packet 44 in FIG. 10A is slightly different from the general command packet shown in FIG. 6. The CMD field identifies the probe as a Probe/Src command that requires the receiving node to transmit its response to the source node 70. As mentioned earlier, in certain other transactions, the target node 72 may be the recipient of responses to the probe command, and in those cases the CMD field will again indicate so. Furthermore, depending on the routing involved, it may happen that the source node 70 or the target node 72 or both of these nodes may receive the Probe/Src command prior to or along with the other remaining nodes in the system. The SrcNode and the TgtNode fields in the probe command would identify the source and the target nodes respectively, and would prevent the source node cache controller from responding to the probe command. The SrcTag field functions the same way as earlier described with reference to FIG. 4. The DM (data movement) bit indicates whether a data movement is required in response to this probe command. For example, a clear DM bit may indicate lack of any data movement; whereas if the DM bit is set, data movement is required if the probe command hits a dirty or a shared/dirty block in the internal (or external) cache in one of the remaining nodes 74 or 76.

As described earlier, the read command from the source node may be a sized read command [Rd(sized)] or may be a block read command [RdBlk, RdBlkS or RdBlkMod]. Both types of read commands preferably require a data movement, and hence the DM bit may be set by the target node's memory controller to indicate data movement requirement. In a different embodiment, the DM bit, when cleared, may indicate data movement and the DM bit, when set, may indicate lack of any data movement.

The NextState field 46 (FIG. 10B) is a two-bit field that indicates the state transition that should occur if there is a probe hit, i.e. if one or more of the remaining nodes have a cached copy of the designated memory location that is identified by the probe command Addr field. One exemplary encoding for the NextState field 46 is shown in FIG. 10B. During a block read command, the NextState field is one (1), and hence, the remaining node having the cached copy of the memory data would mark that copy as shared upon receipt of the Probe/Src command. On the other hand, during a sized read command, the NextState field is zero (0), and hence, no remaining node has to change corresponding cache tag even when it has a cached copy of the data from the memory 421. In certain other target memory transactions (e.g., certain write operations), it may be desirable to mark the cached data in corresponding remaining nodes as invalid as indicated by the NextState field 46 with a value two (2).

Thus, through this NextState field, a probe command may maintain cache coherency among the system processing nodes during a memory read operation. The target node cache controller may transmit a probe response packet along with a read response packet (containing the requested data) upon receiving the Probe/Src command broadcast by the target node memory controller and upon finding the requested data in the target node cache memory (internal or external). As will be described later, the source node updates its cache tag associated with the requested data through the information supplied by the RdResponse and ProbeResp packets. This way the source node may indicate (through the corresponding cache tag) whether it has an exclusive or a shared copy of the requested data. The probe response packet from the target node cache controller may be helpful, for example, in a situation where only the target node has a copy of the requested data in its cache and no other remaining node has a cached copy of the requested data. The target node, on the other hand, may be configured to automatically update its cache state when the target node has in its cache the data requested by the source, and hence, is sending the data to the source from the target node cache.

Referring now to FIG. 11A, an exemplary encoding for a RdResponse packet 48 is shown. The memory controller (not shown) in the target node 72 may be configured to send a RdResponse to the source node 70 in response to each read command, whether a sized read command or a block read command. As mentioned earlier, alternatively, the target node cache controller (not shown) may be configured to send an appropriate read response packet in case the requested data is cached in the target node. The RdResponse packet 48 is typically followed by a data packet 38 (FIG. 7) that contains the requested data. The data packet for a sized read operation may be arranged with the lowest addressed datum returned first and the remainder of the addressed data returned in the ascending address order. The data packet for a cache block read, however, may be arranged with the requested quadword (64 bits) returned first, and the remainder of the cache block may be returned using interleaved wrapping.

The Count field in the RdResponse packet 48 is identical to the Count field in the read command packet (see, for example, FIG. 6) that started the read transaction. The Type field encodes the size of the original read request, and along with the Count field, indicates the total size of the data packet. The Type field may take binary values 0 or 1. In one embodiment, the Type field, when zero, may indicate that a byte size of data is to be transferred. The Type field, when one, may indicate that a quad-word (64 bits) of data is to be transferred. The Count field, on the other hand, indicates how many times that size of data, as indicated by the Type field, needs to be transferred over a link. Thus, the Count field and the Type field, in combination, may determine the total size of the data to be transferred. For example, during a sized read operation over an 8-bit unidirectional link, to transfer a double word the Type field must be zero and the Count field must be three [011 in the binary].

The RespNode field in the RdResponse packet 48 identifies the node to which the read response packet is directed. The SrcNode field identifies the node that started the transaction, i.e. the source node 70. During a read operation, the RespNode and the SrcNode fields will identify the same node, i.e. the source node 70. As described later with reference to FIG. 13, a RdResponse may be generated by one of the remaining nodes that has in its cache a dirty copy of the addressed memory location (in the target memory 421). The Probe bit may be set to indicate that the read response 48 was generated by a node in response to a probe that required data movement. A clear Probe bit may indicate that the RdResponse 48 is either from the memory controller (not shown) or from the cache controller (not shown) at the target node 72.

The Tgt bit is the bit in the bit position [0] in the CMD[5:0] field. In one embodiment, the Tgt bit, when set, may indicate that the RdResponse 48 is destined for the memory controller (not shown) in the target node 72 (during, for example, some write transactions). On the other hand, the Tgt bit, when clear, may indicate that the RdResponse 48 is destined for the source node 70. The Tgt bit, thus, may identify how the data flow is managed internally within a node. The Tgt bit may be omitted in an embodiment.

The table 50 in FIG. 11B shows one example of a relationship between the Probe bit, the Tgt bit, the Type field, and the Count field. As shown therein, the probe bit is clear whenever the RdResponse 48 is from the memory controller (not shown) or from the cache controller (not shown) at the target node 72. In one embodiment, the target node 72 may supply less than a cache block size of data (for example, during a sized read operation). The Type and the Count fields may jointly specify the size of the data to be transferred to the source node 70. As described later, when one of the remaining nodes (node 74 or node 76) sends a RdResponse packet to the source node 70, the only size of data that may be transferred is a cache block. In that situation, the Count field must be 7 (binary 111) and the Type field must be 1 to accomplish a 64-byte data transfer (assuming that the cache block size is 64 bytes).

Referring now to FIG. 12, an example of a ProbeResp packet 52 is shown. Generally, a processing node (one or more of the remaining nodes or the target node 72) that has an associated cache memory responds to the Probe/Src command by directing a ProbeResp packet to the source node 70 indicating a MIss or a HitNotDirty. However, if the responding node has a modified cached copy of the requested data, it will, instead, transmit a RdResponse as described later. The CMD field, the RespNode field, the SrcNode field and the SrcTag fields are already described earlier with reference to one or more control packets. In one embodiment, the Hit bit is set to indicate (to the source processing node 70) that the responding node has an unmodified cached copy of the addressed memory location. In another embodiment, a clear Hit bit may convey the same indication. The source node 70, thus, gets the necessary information regarding how to mark (in its cache) the block of data received from the target node 72. For example, if one of the remaining nodes 74 or 76 has an unmodified (or clean) copy of the addressed memory location, the source node 70 would mark the data block received from the target memory controller (not shown) as clean/shared. On the other hand, if this is a sized read operation, then the source node 70 may not need to change its cache tag associated with the received data as the data read is less than the cache block in size. This is quite similar to the earlier discussion (FIG. 10B) with reference to the remaining nodes.

FIG. 13 shows an example flow of packets, i.e. the arrangement 54, when one of the remaining nodes (node 76, here) has in its cache a modified copy (i.e., a dirty copy) of the target memory location. As before, the target node memory controller (not shown) sends a Probe/Src command (probe command) and a RdResponse upon reception of the read command from the source node 70. Here, the target node 72 is assumed to have an associated cache memory, and hence, the target node cache controller (not shown) sends a probe response to the source node 70 as described earlier. In the event that the target node 72 also has a cached copy of the requested data, the target node cache controller (not shown) may also send a read response packet along with the requested data as described earlier. In the absence of an associated cache, the target node 72 may not send a probe response packet.

One implementation of the probe command packet and the read response packet has been described earlier in conjunction with FIGS. 10A and 11A respectively. In the embodiment of FIG. 13, however, the responding node 76 is configured to send two packets through its cache controller in response to the probe command—a RdResp packet to the processor in the source node 70 and a MemCancel response to the target node memory controller (not shown). The read response from the remaining node 76 is followed by a data packet containing the modified cache block, as required by the DM (data movement) bit in the probe command packet (FIG. 10A). As described earlier with reference to FIG. 11A, the RdResponse from a non-target node may have its Probe bit set to indicate that the source of the data block is not the target node 72. Through this RdResponse packet from the responding node 76, the source node 70 gets an indication to mark (in its internal cache) the state of the received cache block of data as modified/shared.

The RdResponse packet from the remaining node 76 contains the entire corresponding cache block (in modified state), even if the read command identifies a sized read transaction. In a different embodiment, the responding non-target node (node 76, here) may be configured to send only the requested data directly to the source node. In this embodiment, the size of the data to be transferred to the source node may be encoded as part of the probe command. In yet another embodiment, the responding node 76 may send only the requested data to the memory controller (not shown) in the target node 72 and, thereafter, the target node memory controller sends the data back to the source node 70.

The MemCancel (memory cancel) response from the responding node 76 causes the memory controller at the target processing node 72 to abort further processing of the read command from the source node 70. In other words, the MemCancel response has the effect of canceling the transmission of the RdResponse packet (along with the requested data) from the target node memory controller, and even the cancellation of a prior memory read cycle by the target node memory controller that may have been initiated in response to the read command by the source 70, if the target node memory controller receives the MemCancel response prior to the release of the RdResponse packet from the target node read response buffer or prior to the completion of the memory read cycle, respectively. The MemCancel response, thus, accomplishes two principal objectives: (1) Conservation of the system memory bus bandwidth by eliminating, to the extent possible, relatively lengthy memory accesses when the system memory (e.g., the memory 421) has a stale data. This also reduces unnecessary data transfers over the coherent links; and (2) Maintaining cache coherency among various processing nodes in a multiprocessing computer system by allowing transfer of most recent cache data among the processing nodes.

It is noted that due to the routing involved in the circuit configuration of FIG. 1 the MemCancel response packet from the responding node 76 may not arrive at the target node 72 in time to abort the target node memory controller's transmission of a read response packet or initiation of a relatively lengthy memory read cycle. In such a situation, the target processing node 72 may simply ignore the late-received MemCancel response when it is too late to cancel the read response transmission or the system memory read cycle. The precise point at which a transaction may be aborted may depend on the circuit configuration, the routing implemented, the operating software, the hardware constituting the various processing nodes, etc. When the source node receives the RdResponse from the target node memory controller it simply ignores that RdResponse (and its associated data packet), and, instead, receives its requested data from the cache block supplied along with the RdResponse packet from the remaining node 76.

Upon receiving the MemCancel response, the target node memory controller transmits a TgtDone (target done) response to the source processing node 70. The TgtDone response is transmitted regardless of whether the target node earlier sent its RdResponse packet (along with the requested data) to the source node 70. If the target node memory controller did not earlier send the RdResponse packet, it cancels the transmission of the RdResponse packet (and also of the requested data), and, instead, sends the TgtDone response to the source node 70. The TgtDone response functions to inform the source node 70 of the source of the cache block fill. The presence of the TgtDone response indicates to the source node that the target node memory 421 or target node internal cache (not shown) has a stale version of the requested data, and, hence, the source node 70 must await a modified copy of the cache block from one of the remaining nodes (e.g., nodes 74 or 76).

The source node processor may use, prior to its reception of the TgtDone response, the modified cache block transmitted along with the RdResponse packet by the responding node 76. However, the source node 70 may not reuse its source tag (SrcTag field in its read command packet, FIG.6) prior to sending a SrcDone response because the transaction, i.e. the read operation, initiated by the read command packet may not be complete until the source node 70 receives all the responses generated by the initiation of the read transaction. Therefore, the source node 70 waits until it receives the RdResponse (if sent) from the target node 72, the TgtDone response from the target node, and for any other responses from other remaining nodes (described later with reference to FIG. 14) prior to sending the SrcDone response to the target node memory controller. Similar to the discussion with reference to FIG. 9, the SrcDone response in FIG. 13 signals to the target node the completion of the memory read transaction initiated by the source node. When the target node 72 sends the RdResponse as well as the TgtDone response, the source node may have to wait for both of these responses prior to acknowledging the completion of the read transaction through its SrcDone response. The SrcDone response thus helps maintain cache block fill-probe ordering during a memory read transaction whether the source of the requested data is the target node memory controller or target node internal (or external) cache or one of the remaining nodes having a dirty copy of the cache block containing the requested data.

Referring now to FIG. 14, a packet flow arrangement 56 is shown with respect to a memory read transaction initiated by the source node 70. This embodiment depicts more than one remaining nodes, nodes 74 and 76, and one of the remaining nodes 76 is assumed to have in its cache a dirty (modified) copy of the memory block containing the requested data. Various command and response packets shown in FIG. 14 are similar to those described earlier with reference to FIGS. 9–13. The source processor may not use the data received along with the RdResponse from the node 76 until it also receives the probe responses from all the other remaining nodes (here, the node 74 only) in the system. As described with reference to FIG. 13, the source node may not reuse the SrcTag until the completion of the initiated transaction, i.e. the memory read operation, has been established through the transmission of the SrcDone response. The SrcDone response is transmitted when the RdResponse from the responding node 76, the probe responses from all the remaining processing nodes, the TgtDone response from the target node 72, and the RdResponse from the target node (if already transmitted) are received by the source node 70. The SrcDone and the TgtDone responses (in FIGS. 9, 13, 14, 15A and 15B) are thus used to provide an end-to-end acknowledgement of commands and responses.

Figure 15A:
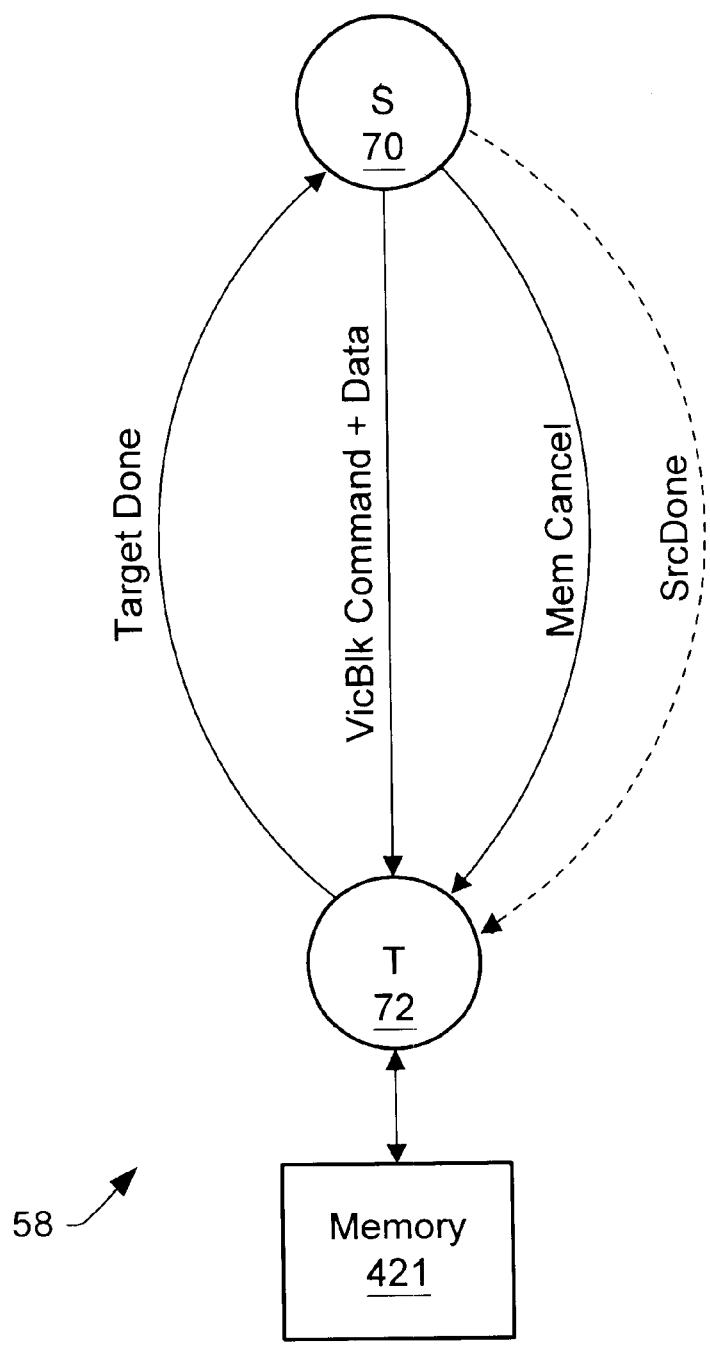
FIG. 15A is a diagram that generally illustrates an example flow of packets during a victim block write operation.

FIG. 15A depicts an example flow of packets 58 during a dirty victim block write operation. A dirty victim block is generally a modified cache block that is being evicted from the cache (not shown) in the processing node originating the victim block write operation, i.e. the source node 70, and is being replaced according to any suitable cache block replacement algorithm. When a dirty victim block is selected for replacement, it is written back into the corresponding system memory—here the memory 421 associated with the target node 72—using the VicBlk command. A memory write back operation is initiated using the VicBlk packet followed by a data packet containing the modified victim cache block. Probes are not needed for the VicBlk command. Accordingly, when the target memory controller is prepared to commit the received victim block data to the memory 421, the target memory controller transmits a TgtDone packet to the source node processor. The source node processor replies with either a SrcDone packet to indicate that the data should be committed or a MemCancel packet to indicate that the data has been invalidated between transmission of the VicBlk command and receipt of the TgtDone packet (e.g. in response to an intervening probe).

It is noted that the source node 70 owns the victim block until it is accepted by the target node memory controller (not shown) for writing into the appropriate memory location in the system memory 421. The target node 72 may place the received victim block in its command data buffer and send a TgtDone response back to the source node processor (not shown) to indicate its acceptance of the victim block. The source node 70, until it receives the TgtDone response, continues processing other transactions involving the data contained in the victim block.

Figure 15B:
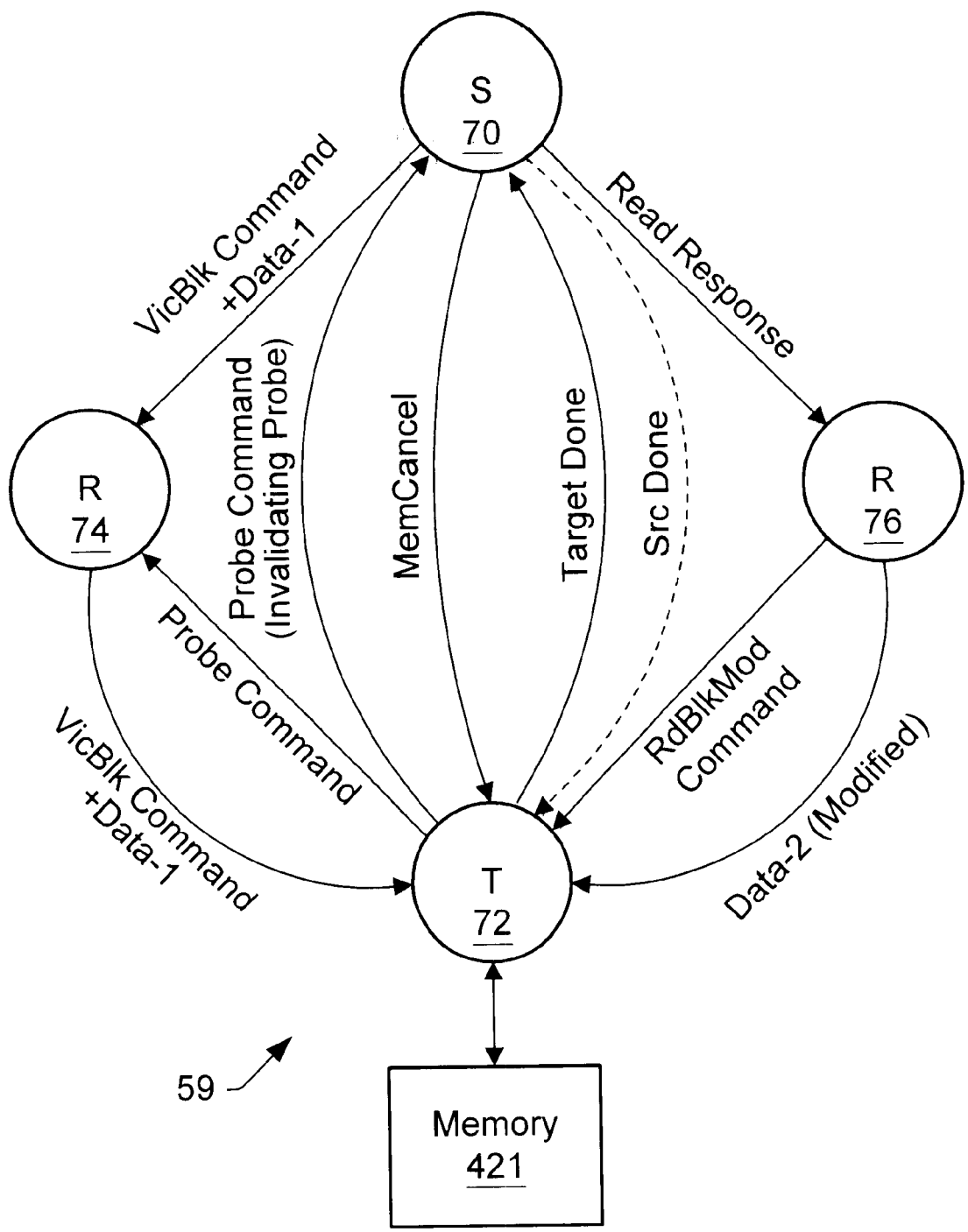
FIG. 15B shows a detailed flow of packets depicting an invalidating probe and a memory cancel response during a victim block write operation.

Referring now to FIG. 15B, a detailed flow of packets 59 indicating reception by the source node 70 of an invalidating probe prior to the TgtDone response is shown. As mentioned earlier, the delivery of a control or a data packet to a target node depends on the routing involved in the system 10. As shown in FIG. 15B, it may happen that the VicBlk command and the victim block data packet (indicated as Data-i in FIG. 15B) from the source node 70 may follow a routing path that includes one of the remaining nodes 74. The time involved in a packet propagation within the system 10 generally depends on the number of intervening processing nodes in the routing path and on the time it takes for each intervening node to retransmit the received command and data packets to the other processing node on the routing path or to the target node 72 as the case may be.

FIG. 15B illustrates an example where one of the remaining processing nodes (node 76, here) sends a RdBlkMod command to the target node 72 after the source node 70 transmits the VicBlk command along with the victim block (Data-1), but before the VicBlk command is received by the target node memory controller (not shown). The RdBlkMod command from node 76 may specify the same memory location in the memory 421 as is the destination for the victim block from the source node 70. As briefly mentioned earlier, the RdBlkMod command may be used when a writeable copy of a cache block is desired. As the RdBlkMod command is one type of a read command, various signal flow patterns shown and described with reference to FIGS. 9–14 may occur during the RdBlkMod command execution.

In response to the RdBlkMod command, the target node 72 may transmit a probe command packet (FIG. 10A) to the source node 70 and to the other remaining node 74 as described earlier with reference to FIG. 9. The source node 70 may respond to the probe command (alternatively known as the invalidating probe) by sending a read response packet (FIG. 11A) along with the requested data, i.e. the victim block, because (i) the source node has the modified copy (i.e., the victim block) of the designated memory location and (ii) the source node has not yet received a target done response from the as target node 72 indicating receipt and acceptance by the target node of the earlier sent victim block. The source node 70 may also send a memory cancel response (not shown in FIG. 15B) to the target node 72 as described earlier with reference to FIG. 13. A probe response from the other remaining node 74 to the read command source node 76 is also not shown in FIG. 1513 for the sake of clarity.

The processing node 76 may also modify the victim block received from the source node 70 and may transmit the modified data (Data-2) to the target node 72 to commit Data-2 to the corresponding memory location in the system memory 421. In the situation illustrated in FIG. 15B, the VicBlk command and the original victim block (Data-1) arrive at the target node after target node accepts the modified victim block (Data-2). Upon receiving the original victim block (Data-1), target node memory controller (not shown) may transmit the target done response to the source node 70 to indicate acceptance of the victim block data packet (Data-1). As the target node 72 may not track the chronology of data transmission events, it is desirable to prevent the target node 72 from overwriting the memory location containing the modified victim block (Data-2) with the later-arriving (but earlier-sent) stale victim block (Data-1). The source node 70, in that case, will transmit a MemCancel response, instead of the SrcDone response, to the target node memory controller when the source node receives the target done response from the target node 72. The MemCancel response from the source node 70, thus, prevents the target node 72 from overwriting the common memory location with the stale data (Data-1).

In general, the source node 70 sends a memory cancel message (MemCancel) in response to the TgtDone message from the target node whenever the source node receives an invalidating probe prior to receiving the TgtDone message but after sending the VicBlk command and the victim block data packets. The memory cancel response thus helps maintain cache coherency among various processing nodes in the system, for example, in a situation when a processing node (here, node 76) other than the source node 70 indicates its intent to modify the data contained in the victim block (Data-1) earlier sent by the source node 70 as indicated in FIG. 15B. The memory cancel response may also conserve the system memory bandwidth by preventing the target node memory controller from initiating a lengthy memory write operation when the data to be committed to the system memory 421 may no longer be valid.

The source node processor may, instead, send a SrcDone packet to the target node memory controller if the TgtDone response is received prior to an invalidating probe as indicated by the dotted arrow in FIG. 151B. In other words, the source node may send a SrcDone response to the target node after it receives the TgtDone message, given the victim block is still valid. In the situation depicted in FIG. 15B, the source node may send a probe response packet (FIG. 12) instead of a read response packet when the probe command arrives after the target done response because the source node may no longer own the victim block once it releases the victim block to the target node by sending a source done message. The SrcDone response signals the completion of the dirty victim lock (Data-1) write operation initiated by the source node processor. No memory cancel response is needed because, for example, a later write operation to the same memory location involving the modified victim block (Data-2) will correctly overwrite the previous (and, hence, stale) victim block (Data-1). Cache coherency among the processing nodes may thus properly be maintained.

It is noted that a victim block command (VicBlk) may only be directed to a system memory, and may only be generated by a coherent processing node (i.e. one of the processing nodes 12A–12D in FIG. 1) and not by, for example, the I/O bridge 20. The SrcDone and the TgtDone responses are used to provide an end-to-end acknowledgement of commands and responses as described earlier.

Figure 16A:
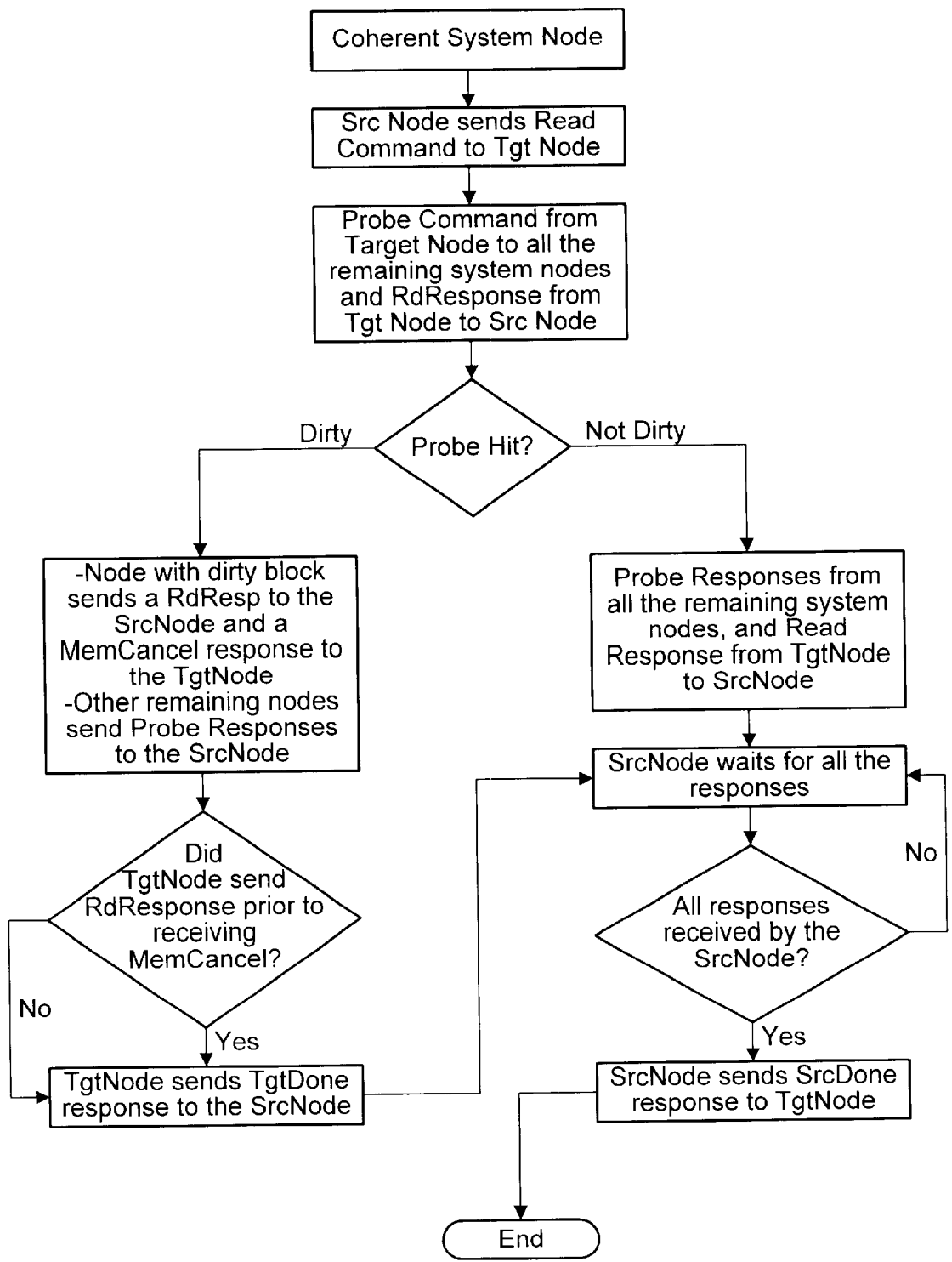
FIG. 16A is an exemplary flowchart for the transactions involved in a memory read operation.
Figure 16B:
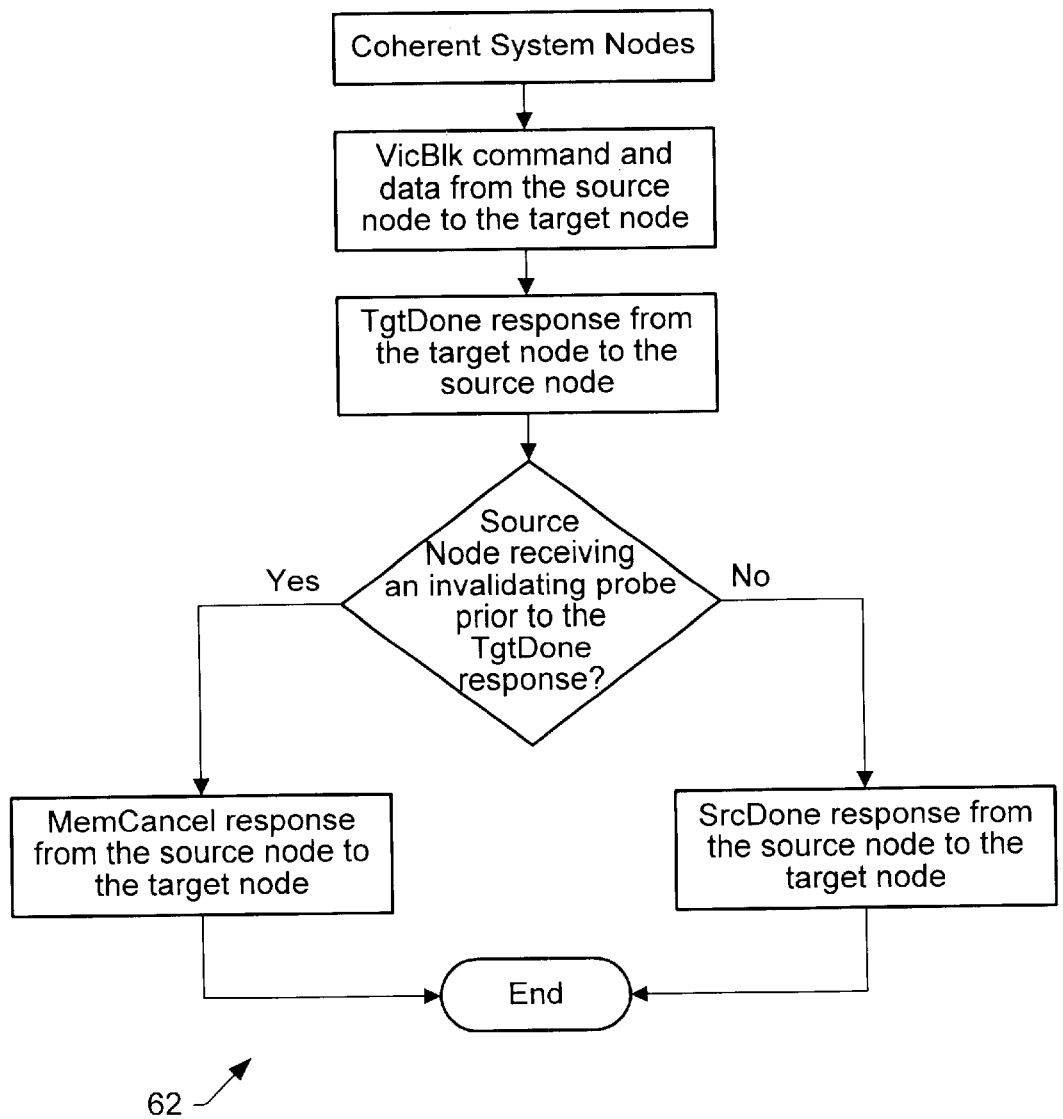
FIG. 16B is an exemplary flowchart for the transactions involved in a victim block write operation.

Finally, FIG. 16A shows an exemplary flowchart 60 for the transactions involved in a memory read operation (whether a sized read or a block read operation). Additionally, FIG. 16B depicts an exemplary flowchart 62 for the transactions involved in a dirty victim block write operation. All the details associated with various blocks in the flowcharts of FIGS. 16A and 16B have already been discussed earlier with reference to FIGS. 9–15B. Various control packets (including command packets and response packets) and the data packet have been illustrated using exemplary embodiments shown in FIGS. 3–8 and 10–12. The system may implement other control and data packets for similar purposes, but using different formats and encodings. The present messaging scheme involving the command and response packets in the system configuration of FIG. 1 may also be implemented in another system configuration.

The foregoing discloses a cache-coherent data transfer scheme in a multiprocessing computer system environment. The data transfer scheme may conserve the system memory bandwidth by causing the target processing node to abort relatively lengthy memory read or write operations on the slower system memory bus. An end-to-end acknowledgement of command and response packets may maintain cache coherency throughout the multiprocessing system.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as falling within the spirit and scope of the present invention as defined by the appended claims.

What is claimed is:

1. A multiprocessing computer system comprising:
   a plurality of processing nodes interconnected through an interconnect structure, wherein said plurality of processing nodes includes:
      a first processing node with a cache memory, wherein said first processing node is configured to identify a dirty cache line in said cache memory that is to be written into a designated memory location and to generate a first memory write operation to transfer said dirty cache line to said designated memory location; and
      a second processing node configured to receive said dirty cache line and to responsively initiate a second memory write operation to write said dirty cache line received from said first processing node into said designated memory location, wherein said second processing node is further configured to transmit a target done message to said first processing node upon receiving said dirty cache line,
         wherein said first processing node is configured to transmit a memory cancel response to said second processing node when said first processing node receives an invalidating probe prior to receiving said target done message, and wherein said memory cancel response causes said second processing node to abort further execution of said second memory write operation.

2. The multiprocessing computer system of claim 1, wherein said interconnect structure includes a first plurality of dual-unidirectional links.

3. The multiprocessing computer system as in claim 2, wherein each dual-unidirectional link in said first plurality of dual-unidirectional links interconnects a respective pair of processing nodes from said plurality of processing nodes.

4. The multiprocessing computer system according to claim 3, further comprising a plurality of I/O devices, wherein said interconnect structure further includes a second plurality of dual-unidirectional links, and wherein each of said plurality of I/O devices is coupled to a respective processing node through a corresponding one of said second plurality of dual-unidirectional links.

5. The multiprocessing computer system of claim 4, wherein each dual-unidirectional link in said first and said second plurality of dual-unidirectional links performs packetized information transfer and includes a pair of unidirectional buses comprising:
   a transmission bus carrying a first plurality of binary packets; and
   a receiver bus carrying a second plurality of binary packets.

6. The multiprocessing computer system of claim 5, wherein each of said plurality of processing nodes includes:
   a plurality of circuit elements comprising:
      a processor core,
      a cache memory,
      a memory controller,
      a bus bridge,
      a graphics logic,
      a bus controller, and
      a peripheral device controller; and
   a plurality of interface ports, wherein each of said plurality of circuit elements is coupled to at least one of said plurality of interface ports.

7. The multiprocessing computer system according to claim 6, wherein at least one of said plurality of interface ports in said each of said plurality of processing nodes is connected to a corresponding dual-unidirectional link selected from the group consisting of said first and said second plurality of dual-unidirectional links.

8. The multiprocessing computer system of claim 1, further comprising:
   a plurality of system memories; and
   a plurality of memory buses, wherein each of said plurality of system memories is coupled to a corresponding one of said plurality of processing nodes through a respective one of said plurality of memory buses.

9. The multiprocessing computer system as in claim 8, wherein each of said plurality of memory buses is bidirectional.

10. The multiprocessing computer system according to claim 8, wherein a first memory from said plurality of system memories is coupled to said second processing node, and wherein said first memory includes said designated memory location.

11. The multiprocessing computer system according to claim 1, wherein said second processing node is configured to transmit said target done message concurrently with initiation of said second memory write operation.

12. The multiprocessing computer system of claim 1, wherein said target done message functions to inform said first processing node of reception of said dirty cache line by said second processing node.

13. The multiprocessing computer system as recited in claim 1, wherein said second processing node is configured to send said invalidating probe.

14. The multiprocessing computer system of claim 13, wherein said second processing node transmits said invalidating probe in response to a data transfer request from a third processing node in said plurality of processing nodes, and wherein said data transfer request is addressed to said designated memory location.

15. The multiprocessing computer system according to claim 14, wherein said data transfer request from said third processing node indicates an intent of said third processing node to modify data contained in said designated memory location.

16. The multiprocessing computer system as in claim 1, wherein said first processing node is configured to transmit a source done message to said second processing node when said first processing node receives said target done message from said second processing node prior to receiving said invalidating probe.

17. The multiprocessing computer system according to claim 16, wherein said source done message signifies completion of execution of said first memory write operation according to a predetermined data transfer protocol and allows said second processing node to respond to a subsequent data transfer request addressed to said designated memory location.

18. In a multiprocessing computer system comprising a plurality of processing nodes interconnected through an interconnect structure, wherein said plurality of processing nodes includes a first processing node, a second processing node, and a third processing node, a method for selectively writing a dirty cache line stored within said first processing node into a corresponding memory location in a memory associated with said second processing node, said method comprising:

said first processing node transmitting a write command along with said dirty cache line to said second processing node;

said second processing node transmitting a target done message to said first processing node upon receiving said dirty cache line;

said second processing node initiating a memory write operation in response to said write command to write said dirty cache line into said corresponding memory location;

said first processing node receiving an invalidating probe prior to receiving said target done message;

said first processing node transmitting a memory cancel response to said second processing node upon receiving said invalidating probe;

and said memory cancel response causing said second processing node to abort further processing of said memory write operation.

19. The method of claim 18, wherein said first processing node receiving said invalidating probe includes:

said second processing node transmitting said invalidating probe to said first processing node in response to a data transfer request by said third processing node, wherein said data transfer request is addressed to said corresponding memory location.

20. The method according to claim 19, wherein said data transfer request from said third processing node indicates an intent of said third processing node to modify data contained in said corresponding memory location.

21. The method as in claim 18, further comprising: said first processing node transmitting a source done message to said second processing node upon receiving said target done message prior to said invalidating probe, thereby allowing said memory write operation to be completed by said second processing node.

* * * * *